United States Patent
Gabel et al.

(10) Patent No.: US 8,993,464 B2
(45) Date of Patent: Mar. 31, 2015

(54) HIGH PERFORMANCE GLASS CERAMICS AND METHOD FOR PRODUCING HIGH-PERFORMANCE GLASS CERAMICS

(75) Inventors: Falk Gabel, Schlangenbad (DE); Eveline Rudigier-Voigt, Mainz (DE); Christian Henn, Frei-Laubersheim (DE); Roland Leroux, Stadecken-Elsheim (DE); Lorenz Strenge, Ingelheim (DE); Roland Dudek, Bad Kreuznach (DE)

(73) Assignee: Schott AG, Mainz (DE)

( * ) Notice: Subject to any disclaimer, the term of this patent is extended or adjusted under 35 U.S.C. 154(b) by 125 days.

(21) Appl. No.: 13/384,875

(22) PCT Filed: Jul. 13, 2010

(86) PCT No.: PCT/EP2010/004250
§ 371 (c)(1),
(2), (4) Date: Mar. 13, 2012

(87) PCT Pub. No.: WO2011/009544
PCT Pub. Date: Jan. 27, 2011

(65) Prior Publication Data
US 2012/0157290 A1   Jun. 21, 2012

Related U.S. Application Data

(60) Provisional application No. 61/316,557, filed on Mar. 23, 2010.

(30) Foreign Application Priority Data

Jul. 20, 2009   (DE) .......................... 10 2009 034 152
Jan. 28, 2010   (DE) .......................... 10 2010 006 232

(51) Int. Cl.
*C03C 10/00* (2006.01)
*C03C 10/14* (2006.01)

(52) U.S. Cl.
CPC .................................. *C03C 10/0027* (2013.01)
USPC .................................................. 501/2; 501/4

(58) Field of Classification Search
CPC .... C03C 10/00; C03C 10/0045; C03C 10/16; C03C 10/0027; C03C 10/0009; C03C 10/0018; C03C 10/0036
USPC ........................... 501/2, 3, 4, 5, 6, 7, 8, 9, 10
See application file for complete search history.

(56) References Cited

U.S. PATENT DOCUMENTS 3,637,453 A * 1/1972 Simmons ...................... 428/410
3,809,543 A   5/1974 Gaskell et al.

(Continued)

FOREIGN PATENT DOCUMENTS

CN          1702049 A    11/2005
DE      102005019247    12/2005

(Continued)

OTHER PUBLICATIONS

English Translation of International Preliminary Report on Patentability corresponding to International Patent Application No. PCT/EP2010/004250.

(Continued)

*Primary Examiner* — Noah Wiese
(74) *Attorney, Agent, or Firm* — Ohlandt, Greeley, Ruggiero & Perle, LLP

(57) ABSTRACT

The invention relates to a glass ceramic comprising article, wherein the integral, non-post-processed and non-reworked glass ceramic comprising article comprises at least three different types of microstructures. The microstructures differ in the number and/or size of the crystallites contained per unit volume, and/or in the composition of the crystallites, and/or in the composition of the residual glass phases. The different microstructures are characterized by different relative ion content profiles across a cross-section perpendicular to the transition areas. The relative ion content profiles are determined from intensities which are determined using secondary ion mass spectrometry, and each of the three different types of microstructures preferably has different intensity plateaus for individual ions, wherein the individual ions are components of the main crystal phases.

21 Claims, 5 Drawing Sheets

(56) References Cited

U.S. PATENT DOCUMENTS

| | | | |
|---|---|---|---|
| 3,997,352 A * | 12/1976 | Beall | 501/3 |
| 4,211,820 A | 7/1980 | Cantaloupe et al. | |
| 4,218,512 A | 8/1980 | Allersma | |
| 6,515,263 B2 * | 2/2003 | Mitra et al. | 219/443.1 |
| 8,338,318 B2 | 12/2012 | Siebers et al. | |
| 2005/0252503 A1 | 11/2005 | Siebers et al. | |
| 2005/0255983 A1 | 11/2005 | Becker et al. | |

FOREIGN PATENT DOCUMENTS

| | | |
|---|---|---|
| EP | 1170264 | 1/2002 |
| JP | 2005325017 A | 11/2005 |
| JP | 2005325018 A | 11/2005 |

OTHER PUBLICATIONS

International Search Report dated Nov. 19, 2010 corresponding to International Patent Application No. PCT/EP2010/004250.

International Preliminary Report on Patentability dated Nov. 3, 2011 corresponding to International Patent Application No. PCT/EP2010/004250.

Japanese Office action dated Jan. 30, 2014 corresponding to Japanese Patent App. No. 2012-520928 with English translation.

English translation of Chinese Office Action dated Dec. 27, 2013 corresponding to Chinese Patent App. 201080041650.0.

Chinese Office Action dated Sep. 5, 2014 corresponding to Chinese Patent Application 201080041650.0 with English translation.

* cited by examiner

HIGH PERFORMANCE GLASS CERAMICS AND METHOD FOR PRODUCING HIGH-PERFORMANCE GLASS CERAMICS

The invention relates to glass ceramics, the production and use thereof, and particularly relates to high-performance glass ceramics with significantly improved physical and chemical properties.

From prior art, various methods for producing glass ceramics are known which in particular optimize the mechanical properties of the product or manufacturing properties of glass ceramic articles. The main starting points for this optimization are an alteration of the composition of the starting glasses, or a variation of the heat-up rate which can be run faster or slower.

When the composition of the green glasses is altered, the focus of optimization is often on the workability of the glass ceramics, for example targeting at lower processing temperatures. Moreover, the composition influences the properties of glass ceramics since it influences transition enthalpy and hence the transition rate of the system.

A challenge in the production of glass ceramics is the production of large or very thin-walled glass ceramic articles. Upon transition to a glass ceramic a new crystalline phase is formed. This transformation is always associated with a change in volume of the ceramizing article. Since, in different areas of the article, the transition and thus the volume change happens at different times and with different speeds, stresses are induced between different areas of the article. These stresses may become substantial to an extent which are hardly controllable, in particular for large-sized articles, where a large volume of glass has to be transformed, or for very thin articles whose mechanical stability is precarious, alone due to the very thin walls. Therefore, production thereof is very difficult and usually uneconomic.

The products mentioned above often suffer from a relatively low impact resistance. Especially opaque glass ceramics often have an impact resistance insufficient to meet specific product requirements. For example, manufacturing of a glass ceramic having a high white level (L*>90 in the Lab color space), requires ceramizing temperatures of more than 1000° C., typically even more than 1080° C. However, many white opaque glass ceramics which were transformed at temperatures of more than 1080° C. exhibit a pronounced network of cracks already immediately after transformation, and therefore have a very low or almost no impact resistance.

EP 1170264 B1 teaches the production of translucent glass ceramics exhibiting a relatively high impact strength which is attributed to a compressive stress generated at the surface. This compressive stress is caused by a high quartz mixed crystal phase at the surface and a keatite mixed crystal phase inside the glass ceramic. Since the high quartz mixed crystal phase exhibits lower thermal expansion than the keatite mixed crystal phase, a compressive stress is induced in the surface zones during cooling subsequently to the phase transition.

However, the high quartz mixed crystal phase may, on the one hand be problematic in terms of its acid resistance, and on the other hand it is only produced through a very precise process control. For example, it has to be ensured that, during cooling, the high quartz included does not rearrange into a low quartz structure near the surface. Also, if the $SiO_2$ content is too high, this may result in a transformation to the low quartz structure.

DE 10 2005 019 247 B4 describes a ceramizing method which allows the production of glass ceramics having a high temperature difference resistance (TDR). This good TDR is achieved by a special ceramizing method which is characterized by high heat-up rates. However, no information is given on the impact resistance of the so produced glass ceramics; neither is the resistance to acids disclosed.

Furthermore, it has proved extremely difficult to transform glass ceramics as described in DE 10 2005 019 247 B4 and at the same time maintaining their shape. The document teaches transformation of a high quartz mixed crystal phase into a keatite mixed crystal phase at relatively high temperatures in combination with high heat-up rates. Such a process may easily cause deformations and deviations from flatness, for example when ceramizing flat panel-shaped articles. To keep such distortions or warping as low as possible, specific holding periods at a maximum temperature are generally required which reduce deviations from flatness of the substrate.

However, if only slight distortions are permitted or a high flatness of the plates is required, common practice usually is to compensate for or correct this by mechanical finishing, or even by cutting out flat portions from a larger plate.

Cutting out flat portions from a larger plate is disadvantageous, not only in terms of costs. Within a glass ceramic article, a specific sequence of microstructures is formed that contributes to the good mechanical properties of the glass ceramic. If this sequence is interrupted or altered by finishing operations such as by cutting or grinding, defects may arise in these areas. For example, the mechanical and chemical resistance of machined glass ceramics tends to be significantly worse than that of non-reworked glass ceramics. In this case, the inner glass ceramic microstructure is exposed at the surface and has micro-cracks in parts thereof, and is no longer protected against a growth of cracks or against an attack of aggressive chemicals by the more resistant superficial microstructure.

Therefore, the object of the invention is to provide a glass ceramic that exhibits improved mechanical and chemical properties, especially a better impact resistance and improved resistance to acids. In addition, a method is to be developed by which the article according the invention can be produced.

This object is solved by the subject matter of the independent claims. Advantageous embodiments and modifications are set forth in the dependent claims.

A glass ceramic comprising article according to the invention which is integral and had not been post-processed nor reworked can be produced by a method in which at least one precursor article is transformed, at least partially, to a glass ceramic comprising article. The glass ceramic comprising article can be translucent, and can preferably be opaque.

The characterization of the glass ceramic comprising article to be integral and non-post-processed and non-reworked is primarily intended to define the properties of a glass ceramic comprising article according to the invention relative to prior art. In particular, it is intended to make clear that the properties as described are not produced by any subsequent processing steps such as grinding or an application of a coating or the like, but are immanent to the article in its as-ceramized form.

Either, a precursor article of glass is transformed or ceramized to the glass ceramic comprising article which includes at least one first crystalline phase. Or, a first crystalline phase of a precursor article which comprises at least this first crystalline phase is transformed to a second crystalline phase of the glass ceramic comprising article.

Otherwise stated, a precursor article in the context of the present invention refers to a green glass with a crystalline phase content below 10 vol. %, or to a glass ceramic article which is transformed or further ceramized to an article with a (different type of) glass ceramic microstructure using the method according to the invention, wherein at least one phase transition occurs.

This phase transition may comprise nucleation in a green glass and subsequent crystallization and growth of crystallites. Alternatively, it may involve transformation of an already existing first crystalline phase in a pre-ceramized precursor article to a different type of crystalline phase, or second crystalline phase. A transformation to a different type of, or second, crystalline phase in this context is understood as an alteration of the structure and composition which occurs for example upon transition from a high quartz mixed crystal phase to a keatite mixed crystal phase.

In case the glass ceramic comprising article is made from an already ceramized precursor article, this does not preclude that the inventive process was also used for the production of the precursor article. That means, both the precursor article and the glass ceramic comprising article can be produced using the method according to the invention.

If a glass ceramic precursor article used, it may have been ceramized independently from the inventive transformation, in particular independently in terms of time. Thus, the precursor article may temporarily have been cooled to room temperature.

However, the invention also covers the case in which a glass ceramic precursor article is produced immediately before the inventive transformation and is not cooled to room temperature in the meantime. It is also possible for the precursor article and the glass ceramic comprising article to be produced in a continuous process.

A precursor article may contain coloring metal oxides, so that the glass ceramic comprising article which is produced from this precursor article is colored across its volume. Generally, any coloring oxides or dopants for glass ceramics known from prior art might be added.

In the context of the present invention, a "translucent" glass ceramic comprising article is understood as an article with a transmittance from 0.10 to 0.95, in a range between 400 nm and 1600 nm. In contrast, an "opaque" glass ceramic comprising article exhibits virtually no transmission; it has a transmittance from 0 to 0.10. Since a glass ceramic article which was produced in the same way, i.e. using the same process parameters, but with different wall thicknesses, can be translucent in case of a small thickness and can appear opaque in case of a larger thickness, the transmittance and thus the terms "translucent" and "opaque" are to be understood relative to a wall thickness of 4 mm.

During the process, the precursor article is heated to a maximum temperature. The heat-up rate for reaching the maximum temperature is preferably more than 10 K/min, and more preferably between 14 and 36 K/min. Generally, there is no process-related upper limit for the heat-up rate, rather it depends on the technological feasibility, e.g. the performance of the employed furnace.

When the maximum temperature is reached, it is maintained for a very short holding time, as compared to prior art, of not more than two minutes. Preferably, no holding time is observed at all, or, in other words, a holding time is substantially or completely dispensed with. This is advantageous because it saves process time. However, holding times during nucleation are possible without departing from the scope of the invention.

The method according to the invention can generally be applied for glass ceramics of any compositions, since it relates to general issues of glass ceramic manufacturing which will be described in more detail below.

As described above, a particular concern with large-sized or thin-walled articles is the occurrence of internal stresses in a glass ceramic article which affect impact resistance and thus the strength and durability of the article. Large-sized articles in the context of this description refer to dimensions of a volume of more than 1 m$^3$; thin-walled articles refer to those having a wall thickness of less than 3 mm. According to the common understanding, the occurrence of these stresses is mainly due to two mechanisms.

The first mechanism implies that the phase transformation starts at different times in different areas of the precursor article and proceeds at different speeds. The phase transition produces crystallization heat. If this heat cannot be dissipated quickly enough, resulting overheat locally increases the ceramization rate. Since the progressive transformation additionally leads to a drastic increase in viscosity, the already transformed or crystallized areas are much less able to compensate for occurring stresses than the areas not yet transformed. Especially stresses that occur towards the end of the exothermic transformation period when viscosity is already significantly increased due to the well-advanced transformation cannot be relaxed sufficiently anymore. The so produced glass ceramic article has only a low strength, in particular low impact resistance.

As described above in the introductory part in detail, a possibility to address this problem is to reduce the heat-up rate or heating rate, resulting in a significantly prolonged period of maximum crystallization. This slowdown allows a partial relaxation of arising stresses, already during ceramizing. However, a general slowdown of the heat-up rate also implies significantly extended process times and thus a lower throughput and increased costs. Moreover, the glass ceramic article after having reached the maximum temperature continues to ceramize.

The second way or the second mechanism that may produce stresses in a glass ceramic microstructure which are critical in terms of strength, is due to a gradient of thermal expansion coefficients of different crystalline phases in a glass ceramic microstructure. It is known that, with a moderate rate of transformation, transfer of material may occur between the individual phases in the microstructure. As a result, individual phases may become enriched in specific components and may alter its type of microstructure in this way. This alteration in microstructure type is associated with a modification of the specific thermal expansion coefficient. In a microstructure, for example, which substantially comprises three main phases, namely a keatite mixed crystal as a main crystalline phase inside the glass ceramic, a mixed crystal of the high quartz type microstructure which is located near the surface, and a largely amorphous surface layer, the mixed crystal of the high quartz type microstructure may transform to the low quartz type microstructure due to an enrichment in silicon. This results in a significant alteration in the average thermal expansion coefficient from about $0.1 \times 10^{-6}$ K$^{-1}$ of the high quartz type microstructure to more than $5.0 \times 10^{-6}$ K$^{-1}$ of the low quartz type microstructure. In this way, critical tensile stresses arise inside the glass ceramic which may cause cracking but in any case result in reduced strength.

Such transformations are avoidable by using the here described manufacturing process, which, due to the high heat-up rates combined with almost no retention or holding time of the process at about maximum temperature and with rapid cooling freezes all phase states and prevents any form of further crystallization, enrichment of material and alteration in the microstructure type, or at least reduces them to an uncritical extent with regard to the properties.

The inventors have surprisingly found that, when employing relatively high heat-up rates and in particular very low holding times, products with a novel microstructure can be produced which are particularly distinguished by their high impact strength and excellent resistance to acids. A detailed description of the advantages of the product according to the invention will be given further below.

However, exactly this processing step of shortening or omitting the holding time at about maximum temperature is highly problematic with regard to a compensability of warpage which occurs during phase transformation. For example, the transformation of a high quartz mixed crystal phase to a keatite mixed crystal phase is associated with a significant increase in volume by 0.1 to 2.0%.

The homogeneity of crystallization not only depends on the size and wall thickness of the article to be ceramized, but in particular on the homogeneity of heat input to the article. Therefore, it is desirable for the ceramizing precursor article to be heated as evenly as possible to ensure ceramization to occur as uniformly as possible in horizontal and preferably also in lateral direction. In contrast, with uneven heating there is a risk of deformation or warpage of the glass ceramic comprising article.

One way to avoid such bending or warpage, at least in part, is to observe holding times at a maximum temperature. During the holding time at maximum temperature at least a slight reduction in viscosity occurs in the ceramizing material, as well as an increase in a respective concentration of a phase of the existing phases, and a reduction of tensions. Warpings are at least partially re-leveled. However, at the same time the ceramizing article matures, existing gradients are reduced, and due to the increase in phase concentrations, structural transformations and/or structural alterations are promoted. Therefore, this approach is not suitable for producing glass ceramic articles with the features according to the invention.

If the holding period is significantly reduced or completely omitted, such as suggested according the invention, this possibility of leveling warpage is not applicable. The described problem is aggravated when running high heat-up rates to achieve the maximum temperature. The higher the heat-up rates in the period when phase transition or volume crystallization occurs, the greater is the risk of potential temperature differences arising in the ceramizing precursor article, and the stronger are potential warpings of the product caused by phase transformation.

To avoid these problems, uniform heating of the ceramizing article is desirable, even with high heat-up rates. This can be achieved in different ways. For example, the glass ceramic comprising articles can be manufactured individually in batch furnaces which have only a small furnace volume. First, due to the small furnace volume, rapid temperature control is possible. On the other hand there are no chimney effects that could lead to temperature uncertainties, such as for example when production takes place in a roller kiln. This, however, is not to say that production in a roller kiln is disadvantageous. Here only the effort to achieve uniform heating is greater. A useful measure in this regard is, for example, to heat the ceramizing article from different directions to allow for better compensation of temperature differences that may occur for example due to the geometry of the furnace. Also, heating may be performed, for example, from the top and bottom of the ceramizing precursor article.

Therefore, according to a particularly preferred embodiment of the invention the temperature gradient between top and bottom of the precursor article is kept as low as possible. The temperature differences between top and bottom should preferably not deviate by more than +/−1 K from an average temperature in the precursor article. In this way, deformations and deviations from flatness can be reduced or even completely avoided.

According to an advantageous embodiment of the invention, temperature changes of the precursor article are measured, preferably continually and in particular during the critical period of volume crystallization, i.e. in the period of exothermic phase transition. In this way, critical deviations from an average temperature in the ceramizing precursor article can be detected and can be regulated by correcting or adjusting the furnace heating according to specified target values.

Moreover, besides vertical temperature control in the ceramizing precursor article, horizontal temperature control can be performed beneficially. To this end, heating of the furnace or chamber in which phase transition is performed, is controlled such that the temperature distribution across the width and/or the length of the transforming precursor article deviated by not more than +/−5 K from a mean temperature in the transforming precursor article, at least during phase transition.

The vertical or horizontal temperature changes can for example be detected by means of temperature sensors which are arranged in close proximity to the ceramizing precursor article. In a particularly preferred embodiment such temperature sensors have a response time of less than ten seconds, preferably not more than one second.

Also, the heaters should preferably be controllable within 10 seconds, more preferably within one second. Since phase transition may proceed exothermically and, with high heat-up rates, within a few minutes, fast response times are crucial for effective temperature control.

A particular advantage of the method according to the invention is the form stability between the precursor article and the glass ceramic comprising article. Apart from the alteration in volume due to the phase transition, the precursor article hardly changes its shape during transformation. This is especially advantageous when shaped bodies are ceramized, for example wok bowls. A particular advantage here is that an already ceramized precursor article can be used, which is then subjected to a phase transition according to the invention. Since the article already has an at least partially crystalline microstructure, the minimum viscosities are by orders of magnitudes higher than upon transformation of a green glass into a transparent glass ceramic which includes a high quartz mixed crystal phase, so that no sagging of the upstanding walls nor warpage of the bottom occurs during ceramization. The shape of the wok substantially corresponds to the shape the wok had prior to ceramization, i.e. without considering the volume change caused by the phase transition.

It is particularly preferred to produce a glass ceramic comprising article according to the invention by a method as described above.

A glass ceramic comprising article is characterized in that it comprises, in its non-post-processed and non-reworked state, at least three different microstructures. These microstructures may differ in the number and/or size of the crystallites contained per unit volume, and/or in the composition of the crystallites, and/or in the composition of the residual glass phases.

The at least three different microstructures can be distinguished from each other, for example from different ion contents in the cross section. When the ion content profiles are measured perpendicularly to the transition zones between the individual microstructures, characteristic differences are obtained for each of the individual microstructures.

The relative ion content profiles can be determined using intensities determined by secondary ion mass spectrometry. These intensities do not reflect absolute ion contents; however they can be interpreted as a relative alteration of contents. For the sake of simplification, the "relative ion content profiles" will simply be referred to as "ion content profiles" below.

Particularly preferably, each of the at least three different types of microstructures exhibits different intensity plateaus of individual ions. "Individual ions" preferably are cations which are involved in the formation of the major phases or main phases of the glass ceramic comprising article according to the invention. In an LAS glass ceramic, for example, ions such as Na, K, Li, and Mg cations exhibit intensity plateaus. Such intensity plateaus of individual ions in different microstructural areas are not known from prior art.

The transitions between zones of different microstructures of the glass ceramic comprising article typically reflect the morphology of the boundary faces to the environment, i.e. its contours or surfaces, wherein the zones of different microstructures are consecutively arranged from the surface towards the inside. That is, the different microstructures are nested inside each other in the manner of a Russian doll.

According to a particularly preferred embodiment, the microstructures can be distinguished from each other based on the ratio of crystallites to the residual glass phase. An outer zone which comprises the interface of the glass ceramic comprising article to the environment has a largely amorphous, first microstructure. A largely amorphous peripheral layer or a largely amorphous first microstructure is to be understood as a microstructural zone near the surface that may have a thickness from 30 to 6000 nm and contains less than 10 vol. % of crystallites. Particularly preferred, this microstructural zone does not include any crystallites of the main crystalline phases of the glass ceramic article at all. In any case, not more than 10 vol. % of the crystallites contained in the amorphous surface zone belong to the main crystalline phase(s).

A second zone adjacent to the first zone comprises a second microstructure which has a crystallite content from 10 to 80 vol. %.

A third zone adjacent to the second zone comprises a third microstructure which has a crystallite content of more than 80 vol. %. This microstructure forms the innermost zone of the glass ceramic comprising article.

A particularly preferred embodiment of the glass ceramic comprising article exhibits a class 1 or class 2 resistance to acids, according to DIN 12116. Therefore, such a glass ceramic comprising article can advantageously be used in production processes in which aggressive substances are employed, for example as laboratory equipment, or for lining furnaces or the like.

A particular advantage of the glass ceramic comprising article is its high impact resistance. In a ball drop test it has been demonstrated that a glass ceramic comprising article with dimensions of 200×200×4 mm exhibits mean fracture heights of more than 15 cm, preferably more than 20 cm, and more preferably more than 25 cm (5% fractile of the Weibull distribution). In this test a 535 g steel ball is dropped in free fall from a predefined height on the middle of a sample. The drop height is increased incrementally until fracture occurs. Impact resistance is a statistical value and represents the mean value of fracture heights determined from about 30 samples. The test is similar to the ball drop test in compliance with DIN 52306.

The chemical resistance can also be proved using an S-test in which an inventive glass ceramic comprising article is subjected for 30 minutes to an attack of concentrated sulfuric acid at a temperature of 370° C. In a subsequent ball drop test as described above, the articles still exhibit mean fracture heights of more than 15 cm, preferably even more than 20 cm (5% fractile).

Furthermore, an opaque glass ceramic comprising article according to the invention advantageously exhibits a temperature difference resistance of more than 700° C. Such a temperature difference resistance is not uncommon for glass ceramics which comprise high quartz mixed crystals as the main crystalline phase.

However, glass ceramics that comprise keatite mixed crystals as the main crystalline phase and which have white levels of above L*=95 can only be produced, according to the present knowledge, by ceramization at temperatures from 1070 to 1090° C., preferably at 1080° C., with a dwell time at maximum temperature from 10 to 40 minutes. Shock resistant production, in particular of such keatite mixed crystal glass ceramics with a high white level and a good temperature difference resistance is not trivial, since glass ceramics which are produced according to prior art often present a severe network of cracks, already even within 48 hours after ceramization, without any external trigger. This network of cracks is attributed to a presence of strong internal stresses in conjunction with smallest injuries of the glass ceramic surface.

Surprisingly, the method according to the invention, in particular a high heat-up rate (of more than 10 K/min, preferably 14 to 36 K/min) in combination with a very short holding time (0 to 2 minutes, preferably no holding time at all) at maximum temperatures from 900° C. to 1300° C., enables an industrially exploitable production of glass ceramic articles which in case of specific compositions have a main crystalline phase of keatite mixed crystals and exhibit a white level L* of more than 95, preferably even more than 97. It is believed that the novel microstructure is achieved by means of the parameters described above.

Probably, the high impact and temperature difference resistances obtained by the inventive method are inter alia due to the fact that there are virtually no mixed crystals having a low quartz microstructure in zones near the surface. Experiments have shown that glass ceramics which were produced according to prior art, often comprise an additional zone below the peripheral or substantially amorphous zone that also exists in the product of the invention, which additional zone includes mixed crystals having a low quartz structure. According to the invention, this zone is eliminated.

This zone with mixed crystals of low quartz structure has a thermal expansion coefficient of more than $13 \times 10^{-6}$ $K^{-1}$ which is significantly more than the thermal expansion coefficient of about $1.1 \times 10^{-6}$ $K^{-1}$ inside the glass ceramic article, and even more than the thermal expansion coefficient of about $4 \times 10^{-6}$ $K^{-1}$ in the largely amorphous peripheral zone. So, during cooling at the end of the ceramization process, a significantly stronger volume contraction occurs in the zone with the low quartz structure relative to the adjacent zones. It is believed that this different expansion behavior induces stresses the in the different zones that may lead to surface cracks.

A glass ceramic comprising article according to the invention which can be produced by the described method may, for example, have the following mechanical or chemical properties:

Maximum temperature gradient: 400-800 K
Temperature difference resistance: >700° C.
Thermal expansion coefficient: see FIG. 4
Modulus of elasticity, E, acc. ASTM C-1259: $84\text{-}95 \times 10^3$ MPa
Knoop hardness $HK_{0.1/20}$ acc. ISO 9385: 570-680

Bending strength $\sigma_{bB}$ acc. DIN EN 1288, part 5, R 45: 100-160 MPa

The good impact and temperature difference resistances allow the use of glass ceramic comprising articles according to the invention in fields where there are high differences in temperature over short distances. This can be, for example, cooking surfaces, oven panes, but also white goods or glass ceramic cooking vessels. For example, the use as a cooking vessel is only reasonable by virtue of the impact resistance of the glass ceramic comprising articles according to the invention. It is particularly advantageous in this context that articles according to the invention which are opaque in the visual wavelength range may have a transmittance of >70% in the infrared wavelength range.

Additionally, a high mechanical and also thermal stability means that the articles produced according the invention virtually do not give off any particles or components of the material/composition. Therefore, the inventive articles can be used in the pharmaceutical industry as a container or as system components, in thermal plants, e.g. as furnace linings for temper furnaces and in chemical or physical coating lines in the solar industry, and as high performance ceramics. The latter is especially promoted by the fact that the geometries required therefore are easily produced and provided with smooth surfaces.

Preferred application fields are:
- as kiln furniture and/or support panels in general and e.g. in the ceramic or solar industry;
- as facade plates which may additionally be provided with functional surfaces, for example for binding nitrogen oxides;
- as ceramic articles for high temperature applications and extreme low temperature applications, e.g. for use in the chemical industry;
- as furnace linings, with the advantage over ceramic materials of not emitting any particles/dust, so that they can be used for high purity applications;
- as carrier plates which, due to their high purity, chemical resistance and ensured non existing or only little substance emission, may be used for production processes in the pharmaceutical industry and in medical technology;
- as chemically resistant laboratory equipment;
- as a lining, both flat and shaped, that need to be chemically and thermally highly resistant, for chemical plants, e.g. in CVD and PVD devices in the coating industry;
- as a wafer substrate,
- as a heat shield to shield hot environments;
- as a cover for heating elements, in particular as cooking or frying surface, and in white goods;
- as a window for incinerators;
- as a cover for radiators;
- as a cover for reflectors, flood lights, video projectors, data projectors, photocopiers;
- for applications with thermo-mechanical stress, such as night vision devices;
- as a translucent article with UV protection
- as a facade cover.

According to a particularly preferred embodiment of the invention, a glass ceramic comprising article may have the following composition:
60-73.0 wt. % $SiO_2$,
15-25.0 wt. % $Al_2O_3$,
2.2-5.0 wt. % $Li_2O$,
0-5.0 wt. % CaO+SrO+BaO,
0-5.0 wt. % $TiO_2$,
0-5.0 wt. % $ZrO_2$,
0-4.0 wt. % ZnO
0-3.0 wt. % $Sb_2O_3$,
0-3.0 wt. % MgO,
0-3.0 wt. % $SnO_2$.
$P_2O_5$;
0-9.0 wt. %
0-1.5 wt. % $As_2O_3$,
0-1.2 wt. % $Na_2O+K_2O$, with concentrations within the respective ranges given below:
0-1.0 wt. % $Na_2O$,
0-0.5 wt. % $K_2O$, and
0-1.0 wt. % of coloring oxides.

A glass ceramic comprising article that corresponds to any of the above compositions may comprise a first substantially amorphous microstructure which is depleted in Li and Mg ions and enriched in Na and K ions, as compared to the second and third microstructures. As in the following two microstructures, the ion content profiles described exhibit different intensity plateaus in the different microstructures. The relative enrichments or depletions described refer to the level of the intensity plateaus in the different microstructures.

A second microstructure adjacent to the first, substantially amorphous microstructure may advantageously be enriched in Li and Mg ions, relative to the first microstructure. Na and K cations are depleted as compared to the first microstructure.

In the third microstructure, Li and Mg ions are enriched relative to the first two microstructures. In contrast, Na and K ions are depleted as compared to the two other microstructures.

Preferably, the first two microstructural zones have a thickness or width, perpendicular to the transition areas of the microstructures, of not more than 10 µm, and preferably not more than 5 µm, the microstructures being distinguishable based on their ion content profiles.

According to a particularly preferred embodiment of the invention, at least the third microstructure of the glass ceramic comprising article comprises a main crystalline phase of keatite mixed crystals, and a second crystalline phase of high quartz mixed crystals, the ratio between the high quartz mixed crystal phase and the keatite mixed crystal phase increasing towards the surface of the glass ceramic comprising article, continuously or incrementally. Since the high quartz mixed crystal phase has a lower thermal expansion coefficient than the keatite mixed crystal phase, tensions arise which increase relatively continuously from the inside outwards. This comparatively steady increase from the inside outwards has to be understood especially in contrast to the prior art, where there are zones or layers rich in high quartz mixed crystals near the surface. However, between these layers rich in high quartz mixed crystals and the keatite mixed crystal inner zone, there is an abrupt transition of the thermal expansion coefficients, which may have an adverse effect on the stress distribution in the glass ceramic article.

Furthermore, a glass ceramic comprising article according to the invention may include minority crystalline phases such as gahnite mixed crystals or zirconium titanate mixed crystals. A particularly preferred embodiment comprises lower amounts of gahnite mixed crystals especially in the first, substantially amorphous microstructural zone and possibly also in all other microstructural zones. The inventors suppose that gahnite mixed crystal concentrations, especially in the first microstructural zone, which may be regarded as equivalent to a gahnite doping, advantageously enhance the resistance to acids of the glass ceramic comprising article. The inventors believe that this content is gahnite mixed crystals, especially in combination with a relatively thick amorphous peripheral zone, is responsible for the very good acid resistance of the glass ceramic comprising article compared to the prior art.

Therefore, a particularly preferred glass ceramic comprising article comprises a peripheral zone of the first, largely amorphous microstructure which is enriched in gahnite mixed crystals. According to an additional modification of the invention, the peripheral zone of the first, largely amorphous microstructure includes at least a gahnite doping.

The invention will now be described in detail with reference to exemplary embodiments. In the figures the same or similar features are denoted with the same reference numerals, wherein:

FIG. 1 illustrates a temperature/time diagram of a method according to the invention which can be used to produce an opaque glass ceramic comprising article from a green glass precursor article. The x-axis represents the time, and the y-axis represents the temperature.

Figure 1:
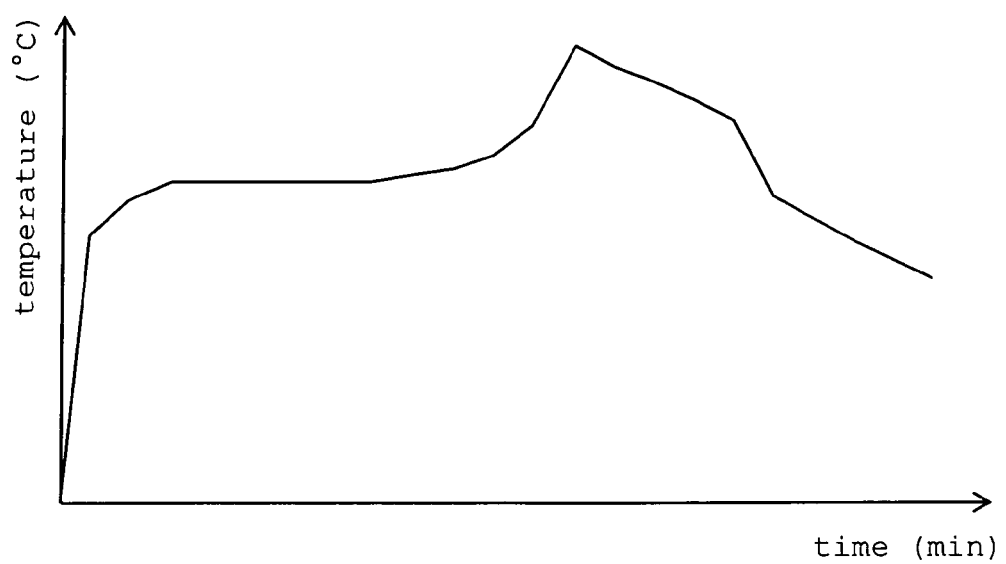
FIG. 1 shows a temperature/time diagram of a method according to the invention for producing an opaque keatite mixed crystal ceramic.

Generally, the method can also be performed with a pre-ceramized precursor article which had been produced separately, in terms of time and optionally location, from the production of the glass ceramic comprising article.

A green glass precursor article with a lithium aluminum silicate (LAS) composition is first transformed to a precursor article having a high quartz mixed crystal phase, and then to a glass ceramic comprising article which comprises at least a keatite mixed crystal phase.

The green glass may have a composition in a range of:
60-73.0 wt. % $SiO_2$,
15-25.0 wt. % $Al_2O_3$,
2.2-5.0 wt. % $Li_2O$,
0-5.0 wt. % CaO+SrO+BaO,
0-5.0 wt. % $TiO_2$,
0-5.0 wt. % $ZrO_2$,
0-4.0 wt. % ZnO
0-3.0 wt. % $Sb_2O_3$,
0-3.0 wt. % MgO,
0-3.0 wt. % $SnO_2$.
0-9.0 wt. % $P_2O_5$;
0-1.5 wt. % $As_2O_3$,
0-1.2 wt. % $Na_2O+K_2O$, with respective concentrations within the ranges given below:
0-1.0 wt. % $Na_2O$, and
0-0.5 wt. % $K_2O$.

Optionally, 1.0 wt. % of coloring oxides can be included.

First, the precursor article is heated from room temperature to about 660° C. within 11 minutes, with a heat-up rate of 58 K/min or even up to 150 K/min. Generally, in this first heating period the heat-up rate can be selected as high as possible, since at this time the viscosity of the precursor article is so low that hardly any internal stresses arise. For economic reasons, however, the heat-up rate should exceed 15 K/min, and should preferably exceed 30 K/min.

Then, until about minute 20 of the processing time, the heat-up rate is slowly decreased to zero, so that either a volume crystallization of the high quartz mixed crystal phase occurs, for example at a constant temperature of 790° C., or a homogenization of the temperature of the article to be ceramized. However, this homogenization stage is only optional, i.e. it is not necessarily specific for the process and therefore not necessarily needed. The holding time during this process step is about 30 minutes.

Generally, a precursor article having a high quartz mixed crystal phase can be produced using any method that generates such a mixed crystal phase. The process period until the end of this volume crystallization is not critical. However, the method steps as described above are preferred, since they imply a comparatively quick process. Generally, the process can be interrupted at this point, and the high quartz mixed crystal comprising article can be cooled to room temperature. In this way a transformation to the keatite mixed crystal phase would be possible separated in time.

Then the ceramizing precursor article is heated to a maximum temperature between 1080° C. and 1300° C., preferably between 1100° C. and 1150° C., and more preferably, as illustrated in the exemplary embodiment, to 1120° C., with a heat-up rate of about 30 K/min. In this process period, the heat-up rate should generally exceed 10 K/min and should preferably be between 14 and 36 K/min, with the upper limit of the heat-up rate depending on the technical possibilities. The relatively high heat-up rates in this process period result in a shift of the transition point from the high quartz mixed crystal phase to the keatite mixed crystal phase to higher temperatures. At the same time the result is an extremely rapid transformation which generally occurs within one to six minutes, preferably within one to four minutes, and more preferably within one to two minutes.

In other words this means that the precursor article is heated to a maximum temperature, and at least 80% of the volume change experienced by the precursor article during the transformation from the high quartz mixed crystal phase to the keatite mixed crystal phase of the glass ceramic comprising article is completed within a time window of one to six minutes, preferably within one to four minutes, and more preferably within one to two minutes, with a heat-up rate of more than 10 K/min, preferably between 14 and 36 K/min to achieve the maximum temperature.

Without observing a holding time at the maximum temperature, the precursor article is then cooled to about 400° C., with an average cooling rate of about 350 K/min to 15 K/min, preferably between 50 K/min and 20 K/min, and is subsequently cooled to room temperature.

It is believed that the comparatively high heat-up rates and the resulting shift of the transition point to higher temperatures in combination with omitting a holding time at maximum temperature, and with subsequent rapid cooling cause the good properties, in particular the high impact resistance, but also a good temperature difference resistance and a very good chemical resistance. At least it can be demonstrated that the glass ceramics which exhibit the microstructure as produced by the inventive method, have the above mentioned properties.

In order to achieve very low internal stresses to arise, the precursor article should be heated up as evenly as possible, at least during the exothermic period of phase transition. Preferably, the temperature gradient across the width of the plate should deviate from an average temperature within the transforming precursor article by not more than +/−1 K.

Preferably, homogeneous heating of the ceramizing precursor article as desired is monitored by sensors, and the furnace temperature is controlled in function of the measured values. However, due to very short transition times of a few minutes, an effective control of the furnace temperature requires regulation to be performed very quickly. Therefore, the temperature sensors preferably have a response time of less than ten seconds, more preferably of not more than one second. A regulation of the heating is preferably achieved within 10 seconds, and more preferably within one second.

Figure 2A:
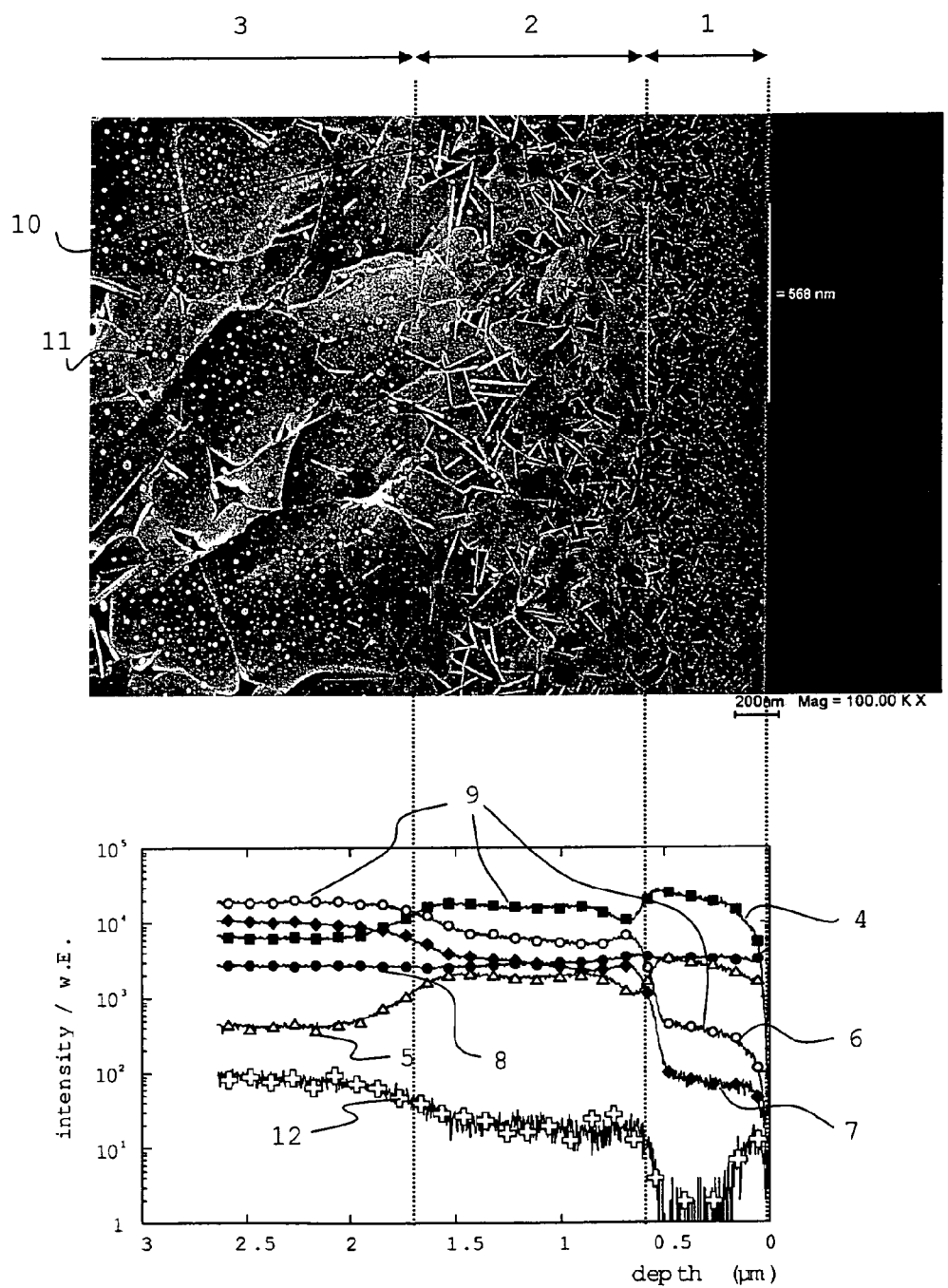
FIG. 2a shows the different microstructural zones of a glass ceramic comprising article according to the invention in a section from the top, and the corresponding ion content profile.
Figure 2B:
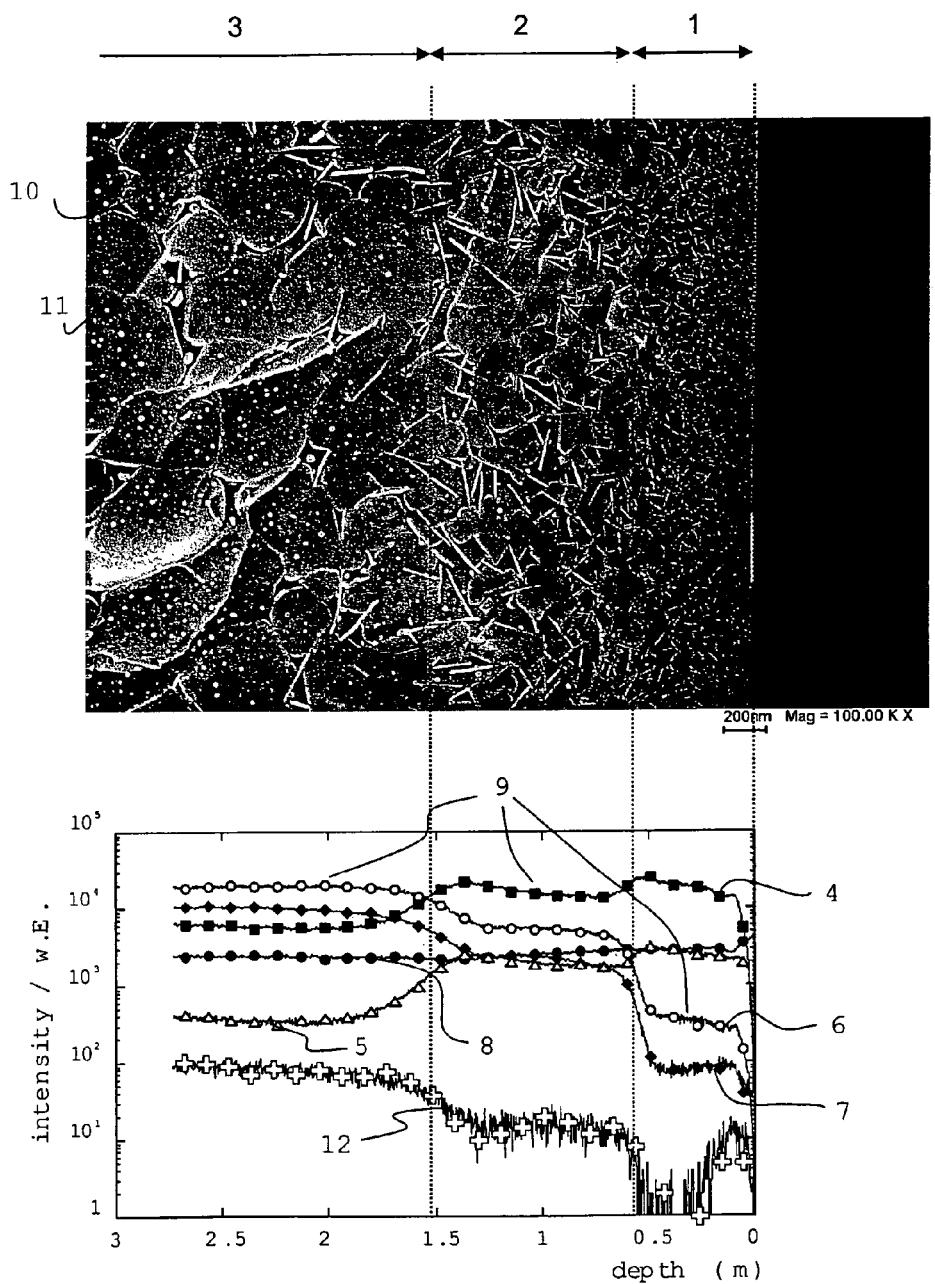
FIG. 2b shows the different microstructural zones of a glass ceramic comprising article according to the invention in a section from the bottom, and the corresponding ion content profile.

FIGS. 2a and 2b each show an SEM image of a glass ceramic comprising article according to the invention and the corresponding ion content profiles which were determined by SIMS measurements. The SIMS measurements are plotted in a coordinate system, with the x-axis representing the depth from the surface of the glass ceramic comprising article towards the center, and the y-axis representing the intensity on a logarithmic scale.

Three different microstructural zones 1, 2, 3 can be distinguished in the section, and the corresponding ion content profiles of the top (FIG. 2a) and the bottom (FIG. 2b) side of a glass ceramic comprising article can be seen. The general microstructure will be explained below with reference to FIG. 2a, while FIG. 2b serves to prove the similarity of the microstructures at the top and bottom side of a glass ceramic comprising article.

A first, largely amorphous microstructural zone 1 is provided at the periphery of the glass ceramic comprising article. This zone 1 may have a thickness of up to six microns. In the example shown in FIG. 2a, it has a width of about 570 nm. This microstructural zone 1 is defined by a glassy, i.e. substantially amorphous, matrix which comprises not more than 10 vol. % of crystallites.

In this first, substantially amorphous zone 1, Na, 4, and K, 5, ions are enriched as compared to the two other zones 2, 3, while Li, 6, and Mg, 7, ions are depleted. Zn ions 12 are particularly enriched in the superficial area, i.e. in the peripheral 100 to 200 nm, and then strongly decrease until the transition to the microstructural zone 2.

The described ion content profiles exhibit intensity plateaus 9 within the individual microstructures 1, 2, 3. An intensity plateau 9 in the present context is not to be understood in its narrow sense of a constant ion content profile, but is primarily intended to emphasized the difference between steeply rising or falling contents, for example in the transition area between the individual microstructures, and the only slowly or slightly changing contents in individual ions within the microstructures.

For example, in case of the ion content profiles for Li, 6, and Mg, 7, in the first microstructural zone 1, a slight increase of the concentration may be recognized towards the inside of the glass ceramic comprising article. However, compared to the transition areas between the first 1 and second 2 microstructural zones, or between the second 2 and third 3 microstructural zones, this increase is very moderate and is therefore described as an intensity plateau 9. Such a microstructural composition which is characterized by intensity plateaus 9, is not known from prior art.

Zone 2 which is contiguous to the inner side of the first, largely amorphous microstructural zone 1, is characterized by a crystallite content from 10 to 80 vol. %, with an increase in crystallite sizes from the outer to the inner side. The increase in size as well as an increase of the ratio between vol. % of crystallites and vol. % of residual glass phase seems to be continuous towards the inner zone.

The ion content profile of this second microstructural zone 2 exhibits a relative enrichment in Li, 6, Mg, 7, and in Zn, 12, ions in comparison to the first, largely amorphous microstructural zone 1. In contrast to the L, 6, and Mg, 7, ions, the Na, 4, and K, 5, ions are depleted as compared to the first, substantially amorphous microstructural zone 1. In this particular case, the second microstructural zone 2 comprises about one micron, but may generally comprise a width ranging from 0.03 to 5.00 μm.

The third microstructural zone 3 is characterized by a crystallite content of more than 80 vol. %. The crystallites, with sizes from 0.05 to 100 μm, are significantly larger than in the two other microstructural zones 1, 2. This third microstructural zone 3 forms the innermost zone of the glass ceramic comprising article.

For this third microstructural zone 3, the content profiles show a relative enrichment in Li, 6, Mg, 7, and Zn, 12, ions, and a relative depletion in Na, 4, and K, 5, ions, as compared to the two other microstructural zones 1, 2, or microstructures.

The concentration in Si ions 8, apart from a very slight trend to decreasing relative concentrations, is essentially constant across the first 1 to third 3 microstructures, i.e. there are virtually any microstructure-specific alterations.

The most conspicuous secondary crystalline phases included in all three microstructural zones 1, 2, 3, are needle- or rod-shaped gahnite mixed crystals 10, and cubical or cube-shaped zirconium titanate mixed crystals 11. Besides, such phases as rutile mixed crystals may appear as minority components, distributed across the entire microstructure. The gahnite mixed crystals 10 seem to dominate the crystal phase in the first, largely amorphous microstructural zone 1. As described above, the Zn ion content profile 12 especially shows an enrichment in the peripheral or near-surface area of the first microstructural zone 1. It can be assumed that the Zn content of the glass ceramic essentially reflects the Zn content of the gahnite mixed crystals 10.

The inventors suppose that the relative enrichment in gahnite mixed crystals in the superficial area allows to at least partly explain the improved chemical resistance of the inventive glass ceramic article, since gahnite has a good resistance to acids. Especially in combination with a relatively thick amorphous peripheral zone (of up to 6 μm) this results in a dual effective "sealing" which protects the inside of the glass ceramic article, in particular against acid attacks.

Figure 3A:
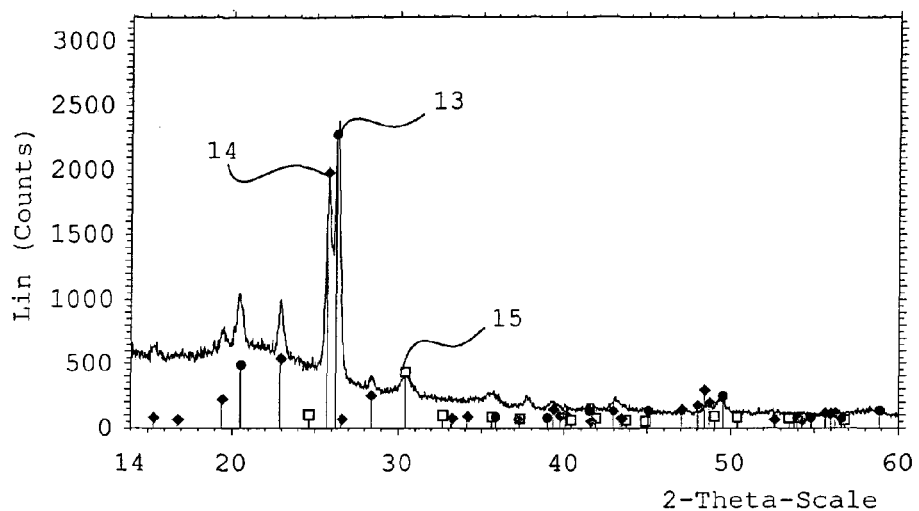
FIG. 3 illustrates thin film X-ray diffraction measurements (TF-XRD) of different depth ranges (FIGS. 3a-3c) of a glass ceramic comprising article according to the invention.
Figure 3B:
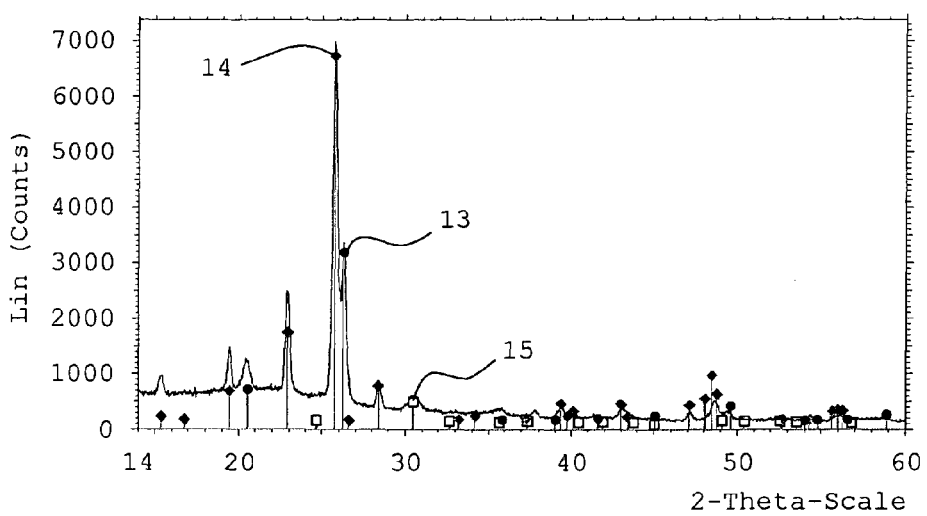
Figure 3C:
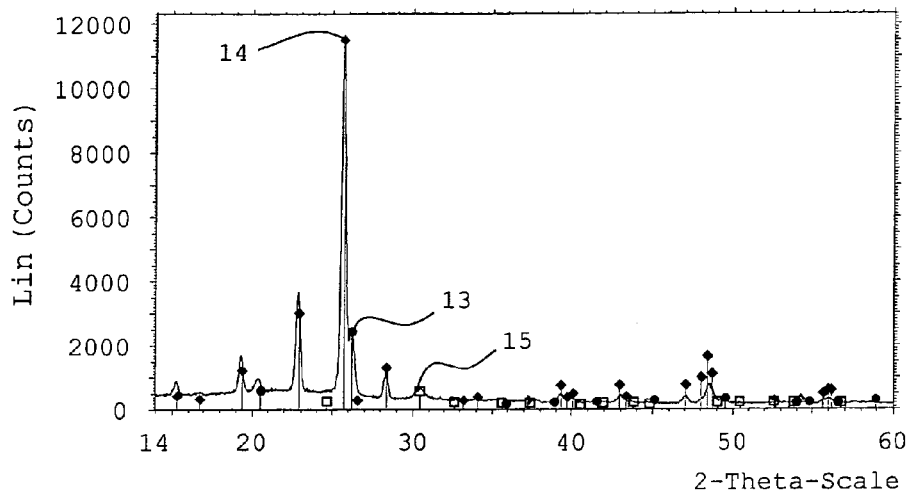

FIG. 3 shows TF-XRD measurements for depths of 0 to 2.5 μm (FIG. 3a); 0 to 5 μm (FIG. 3b); and 0 to 10 μm (FIG. 3c), measured from the surface. The x-axis of these figures represents the diffraction angle, the y-axis represents the intensity. FIGS. 3a-3c show the presence of high quartz mixed crystals 13 rich in Si and of keatite mixed crystals 14 as the main crystalline phases, and of zirconium titanate mixed crystals 15 as a minor component. The ratio of the intensity of the high quartz mixed crystal main peaks at about 26.2° to that of the keatite mixed crystal main peaks at about 25.8° increases from the inner side (FIG. 3c) to the outer side (FIG. 3a). A continuous increase of the relative content in Si-rich high quartz mixed crystals 13 from the inner side to the outer side might be postulated. However, this is just an assumption, since TF-XRD measurements of either the second 2 or the first, largely amorphous microstructural zone 1 were not possible. Should this assumption be true, this would give a continuous diminution of the thermal expansion coefficient, at least across the third 3 and second 2 microstructural zones, from the innermost area outwards. This could have the effect that internal stresses arise in uniformly increasing manner from the inside outwards, at least in these zones 2, 3, and so could allow to explain the good mechanical properties of the glass ceramic comprising article according to the invention.

However, it might be the case that the relative contents of the Si-rich high quartz mixed crystal phase 13 do not increase continuously from inside outwards, but irregularly, or even in many individual increments. However, there is no evidence from the available data for this assumption.

DE 10 2005 019 247 B4 discloses a method for producing a glass ceramic that comprises keatite mixed crystals or high quartz mixed crystals and keatite mixed crystals. In contrast to the prior art mentioned in the patent document, the glass ceramic produced with the method described in the patent document does not require any near-surface high quartz mixed crystal layer to generate a compressive stress at the surface to so ensure a high temperature difference resistance. The method according to the invention ensures specific chemical gradients which cause a different thermal expansion coefficient between the surface and the interior. These different thermal expansion coefficients in turn cause a compressive stress near the surface, which provides for the desired temperature difference resistance.

The glass ceramic has a zone at the surface which is characterized by gradients of K, Na, Zn, and Li ions and which may have a thickness of up to 100 μm, or even up to 160 μm. In contrast to the inventive glass ceramic comprising article, the illustrated ion content profiles do not reveal any intensity plateaus, but continuously decrease or increase from the outside inwards.

Moreover, in contrast to this prior art, a glass ceramic comprising article with an LAS composition which is produced using the method according to the invention, has a content of a high quartz mixed crystal phase 13 which increases from the inside outwards relative to a keatite mixed crystal phase 14. The inside of the glass ceramic comprising article is dominated by a keatite mixed crystal phase 14 having a thermal expansion coefficient of about $1\times10^{-6} K^{-1}$. With the outwardly increasing relative content of high quartz mixed crystals 13, this thermal expansion coefficient decreases to a value between 0 and $1\times10^{-6} K^{-1}$. The largely amorphous first microstructural zone 1, however, has a thermal expansion coefficient of about $3\times10^{-6} K^{-1}$. Regardless of whether the proportion of the high quartz mixed crystal phase 13 increases continuously or incrementally, a compressive stress is built up which is more evenly or at least less dramatically increasing towards the areas near the surface. This is in contrast to the prior art. U.S. Pat. No. 4,218,512, for example, discloses a glass ceramic having a two-tier microstructure, a keatite mixed crystal zone inside and a high quartz mixed crystal zone in the outer area. The transition between these two zones is described as abrupt. There seems to be no intermediary transition between the thermal expansion coefficients.

Another advantage of the method according to the invention compared to the prior art as taught for example in EP 1170264 B1 is that the $SiO_2$ content of the existing high quartz mixed crystals is not critical. According to the aforementioned prior art, the process has to be controlled exactly to achieve that the $SiO_2$ content of the high quartz mixed crystals does not exceed a limit, for preventing transformation to the low quartz structure during cooling. The high quartz mixed crystals which may be contained in a glass ceramic comprising article according to the invention are of relic character, i.e. the ceramization was terminated before these high quartz mixed crystals could be transformed to keatite mixed crystals. Thus, the described method is considerably more robust than the method taught in the prior art, since inaccuracies in process control merely result in a more or less extensive transformation to keatite mixed crystals. There is thus no risk of a formation of high quartz mixed crystals which rearrange to the low quartz microstructure during cooling.

Figure 4:
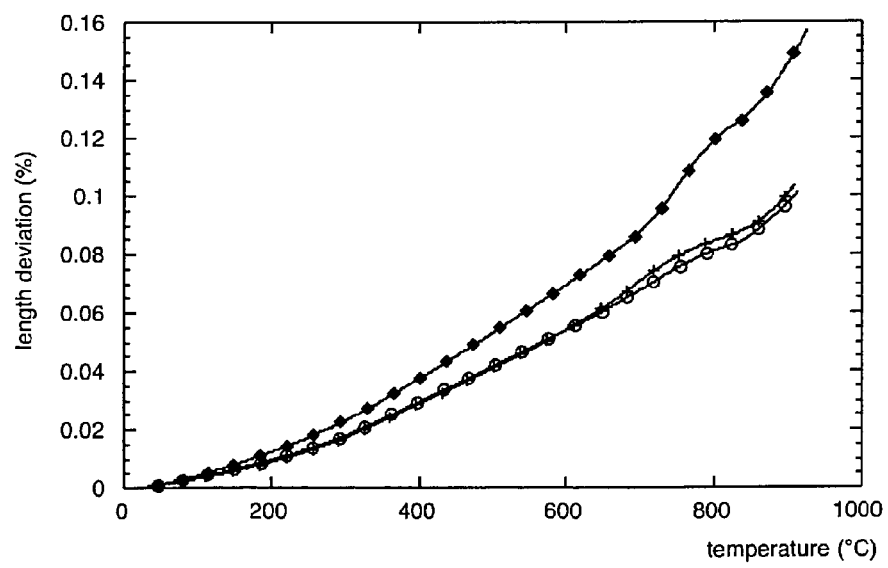
FIG. 4 illustrates relative alterations in length of glass ceramic comprising articles of different compositions for a temperature range from 0 to about 950° C.

For example, a glass ceramic comprising article produced with the process according to the invention and having a wall thickness of 4 mm has the following mechanical and chemical properties, wherein x±s denote a mean value x and the corresponding standard deviation s:

Shock resistance $h_B$:

| | |
|---|---|
| x ± s | 56 ± 13 cm |
| 5% fractile | 33 cm |
| Bending resistance $s_{bB}$: | |
| x ± s | 118 ± 18 MPa |
| TDR (temperature difference resistance) | |
| x ± s | >787° C. |
| Thermal expansion: | see FIG. 4 |
| Transmission: | |
| 400 nm | 0.0% |
| 600 nm | 0.0% |
| 700 nm | 0.2% |
| 1600 nm | 72.0% |
| Chemical resistance: | |
| Water (DIN/ISO 719) | HGB 1 |
| Acid (DIN 12 116) | 1 |
| Base (ISO 695) | A 1 |

Furthermore, a glass ceramic comprising article according to the invention emits little or no particles. An emission of other material components such as alkali ions or alkaline earth ions etc. is only imaginable under extreme conditions, highest temperatures and extremely long operating times under sulfurous atmosphere. This low material emission generally provides for a use of these glass ceramics in areas with high purity standards, for example in the manufacturing of solar cells, or even in the medical and pharmaceutical industries. This low material emission can partly be explained by a very low pore density at the largely amorphous surface, which significantly reduces the outward diffusion of ions, for example under high temperature stress. At the same time, a low pore density also results in a very smooth surface which does not require any finishing.

FIG. 4 shows the relative change in length of glass ceramic comprising articles in function of the temperature, for a temperature range between zero and about 950° C. It is obvious that a glass ceramic comprising article extends by not more than 0.16% when heated from zero to about 950° C. For this temperature range, the maximum average thermal expansion coefficient of the illustrated glass ceramic comprising articles is about $1.7\times10^{-6}/K$, and the minimum thermal expansion coefficient is about $1.1\times10^{-6}/K$.

The invention claimed is:

1. A glass ceramic comprising article, comprising:
   an integral, non-post-processed and non-reworked glass ceramic comprising at least three different microstructures;
   wherein said at least three different microstructures differ in a property selected from the group consisting of a number of crystallites contained per unit volume, a size of the crystallites contained per unit volume, a composition of the crystallites, and a composition of residual glass phases; and
   wherein the at least three different microstructures comprise different relative ion content profiles across a cross-section perpendicular to transition areas, the relative ion content profiles being determined from intensities determined by secondary ion mass spectrometry, each of the at least three different microstructures having different intensity plateaus for individual ions, the individual ions being components of main crystal phases.

2. The glass ceramic comprising article as claimed in claim 1, further comprising transitions between the at least three different microstructures, wherein the transitions reproduce a morphology of an interface to the environment of the glass ceramic comprising article, and wherein the at least three different microstructures are arranged successively from a periphery to an inside of the glass ceramic comprising article.

3. The glass ceramic comprising article as claimed in claim 2, wherein the interface of the glass ceramic comprising article to the environment comprises an outer zone that exhibits a predominantly amorphous first microstructure with a crystallite content being not more than 10 vol. %.

4. The glass ceramic comprising article as claimed in claim 3, further comprising a second microstructure adjacent to the first microstructure, the second microstructure having a crystallite content from 10 to 80 vol. %.

5. The glass ceramic comprising article as claimed in claim 4, further comprising a third microstructure adjacent to the second microstructure, the third microstructure having a crystallite content of more than 80 vol. %.

6. The glass ceramic comprising article as claimed in claim 1, wherein the glass ceramic comprising article exhibits an impact resistance of more than 15 cm fracture height in a ball drop test, wherein given values correspond to 5% fractile of Weibull distribution and relate to a sample size of 200×200×4 mm onto which a 535 g steel ball falls.

7. The glass ceramic comprising article as claimed in claim 1, wherein the glass ceramic comprising article exhibits a resistance to acids of class 1 or class 2 according to DIN 12 116.

8. The glass ceramic comprising article as claimed in claim 6, wherein the glass ceramic comprising article, following a 30 minute attack of concentrated sulfuric acid at a temperature of 370° C., exhibits a fracture height in a subsequently performed ball drop test of more than 15 cm.

9. The glass ceramic comprising article as claimed in claim 1, wherein the glass ceramic comprising article has a composition selected from the ranges of:
60-73.0 wt. % $SiO_2$,
15-25.0 wt. % $Al_2O_3$,
2.2-5.0 wt.% $Li_2O$,
0-5.0 wt. % CaO+SrO+BaO,
0-5.0 wt. % $TiO_2$,
0-5.0 wt. % $ZrO_2$,
0-4.0 wt. % ZnO,
0-3.0 wt. % $Sb_2O_3$,
0-3.0 wt. % MgO,
0-3.0 wt. % $SnO_2$,
0-2.0 wt. % $P_2O_5$,
0-1.5 wt. % $As_2O_3$, and
0-1.2 wt. % $Na_2O+K_2O$, wherein the respective contents are within the specified ranges of:
0-1.0 wt. % $Na_2O$,
0-0.5 wt. % $K_2O$, and
0-1.0 wt. % of coloring oxides.

10. The glass ceramic comprising article as claimed in claim 9, wherein a first microstructure of the at least three microstructures is depleted in Li and Mg ions and is enriched in Na and K ions, as compared to second and third microstructures of the at least three microstructures.

11. The glass ceramic comprising article as claimed in claim 10, wherein the second microstructure is enriched in Li and Mg ions as compared to the first microstructure, while being depleted in Na and K ions as compared to the first microstructure.

12. The glass ceramic comprising article as claimed in claim 11, wherein the third microstructure is enriched in Li and Mg ions as compared to the first and second microstructures, and is depleted in Na and K ions as compared to the first and second microstructures.

13. The glass ceramic comprising article as claimed in claim 10, wherein the first microstructure has a peripheral area that is enriched in gahnite mixed crystals, and/or a non-peripheral area that is depleted in gahnite mixed crystals.

14. The glass ceramic comprising article as claimed in claim 10, wherein the first and second microstructures have a thickness of not more than 10 μm.

15. The glass ceramic comprising article as claimed in claim 10, wherein at least the third microstructure includes a main crystalline phase of keatite mixed crystals and a second crystalline phase of high quartz mixed crystals, a ratio between the high quartz mixed crystal phase and the keatite mixed crystal phase increasing towards a surface of the glass ceramic comprising article.

16. A method for producing a glass ceramic comprising article, comprising:
transforming at least one precursor article, at least partially, to a glass ceramic comprising article,
wherein either a first precursor article of glass is ceramized to the glass ceramic comprising article; or
at least a first crystalline phase of a second precursor article is further ceramized to a second crystalline phase of the glass ceramic comprising article; and
wherein the first or second precursor article is heated to a maximum temperature so that a temperature distribution between a top and a bottom of the first or second precursor article deviates by not more than ±1 K from an average temperature at least during an exothermic period of phase transition,
wherein the maximum temperature is achieved with a heat-up rate that is above 10 K/min, and
the maximum temperature being maintained for not more than two minutes.

17. The method as claimed in claim 16, wherein the heat-up rate that is run to achieve the maximum temperature is between 14 and 36 K/min.

18. The method as claimed in claim 17, wherein at least 80% of a volume change experienced by said first or second precursor article during ceramization to the first or second crystalline phase of the glass ceramic comprising article is completed within a time window comprising one to six minutes.

19. A glass ceramic comprising article which is produced by the method as claimed in claim 16.

20. The glass ceramic comprising article as claimed in claim 1, wherein the glass ceramic comprising article is configured for use as a device selected from the group consisting of a support plate, an oven liner, a furnace lining, chemically resistant laboratory equipment, an oven pane for incinerators, a heat shield for shielding hot environments, a cover for reflectors, flood lights, video projectors, data projectors, or photocopiers, night vision devices, a cover for heating elements, a cooking or frying surface cover, a heater cover, a wafer substrate, a translucent article with UV protection, and a facade plate.

21. A method for producing a glass ceramic comprising article, comprising:
transforming at least one precursor article having a top and a bottom to a glass ceramic by heating the at least one precursor article to a maximum temperature so that a temperature distribution between the top and the bottom deviates by not more than ±1 K from an average temperature at least during an exothermic period of phase transition, wherein the maximum temperature is achieved with a heat-up rate that is above 10 K/min; and maintaining the maximum temperature for not more than two minutes so that the glass ceramic has at least three different microstructures that differ in a property selected from the group consisting of a number of crystallites contained per unit volume, a size of the crystallites contained per unit volume, a composition of the crystallites, and a composition of residual glass phases and the at least three different microstructures comprise different relative ion content profiles across a cross-section perpendicular to transition areas, the relative ion content profiles being determined from intensities determined by secondary ion mass spectrometry, each of the at least three different microstructures having different intensity plateaus for individual ions, the individual ions being components of main crystal phases.

* * * * *